United States Patent
Wakatani

Patent Number: 5,404,531
Date of Patent: Apr. 4, 1995

[54] METHOD AND APPARATUS FOR COMPILER PROCESSING ON PROGRAM RELATED TO DATA TRANSFER AND CALCULATION, AND METHOD OF MANAGING MEMORY

[75] Inventor: Akiyoshi Wakatani, Osaka, Japan

[73] Assignee: Matsushita Electric Industrial Co., Ltd., Osaka, Japan

[21] Appl. No.: 98,162

[22] Filed: Jul. 28, 1993

Related U.S. Application Data

[63] Continuation of Ser. No. 581,944, Sep. 12, 1990, abandoned.

[30] Foreign Application Priority Data

Oct. 11, 1989 [JP] Japan ................. 1-265503

[51] Int. Cl.⁶ ............................................ G06F 9/45
[52] U.S. Cl. ................. 395/700; 364/DIG. 1; 364/280; 364/280.4; 364/280.5; 364/274.4; 364/275.5
[58] Field of Search ........... 395/200, 700, 650, DIG. 1

[56] References Cited

U.S. PATENT DOCUMENTS

| | | | |
|---|---|---|---|
| 4,667,290 | 5/1987 | Goss et al. | 364/300 |
| 5,170,465 | 12/1992 | McKeeman et al. | 395/700 |
| 5,276,880 | 1/1994 | Platoff et al. | 395/700 |
| 5,280,613 | 1/1994 | Chan et al. | 395/700 |

Primary Examiner—Kevin A. Kriess
Assistant Examiner—Jon Backenstose
Attorney, Agent, or Firm—Lowe, Price, LeBlanc & Becker

[57] ABSTRACT

Syntax of a source program is analyzed to translate the source program into an intermediate language. The intermediate language is subjected to optimization to be translated into an object program. A description of macro portions is expressed by a list structure. The macro portions are subjected to a code movement by the optimization. A description of details of the macro portions is expressed by an array. The array corresponding to the description of the details of the macro portions is designated by pointers provided in attributes of elements representing the macro portions in the list structure.

5 Claims, 7 Drawing Sheets

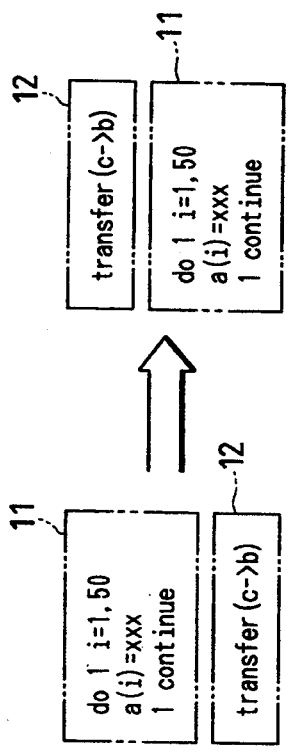
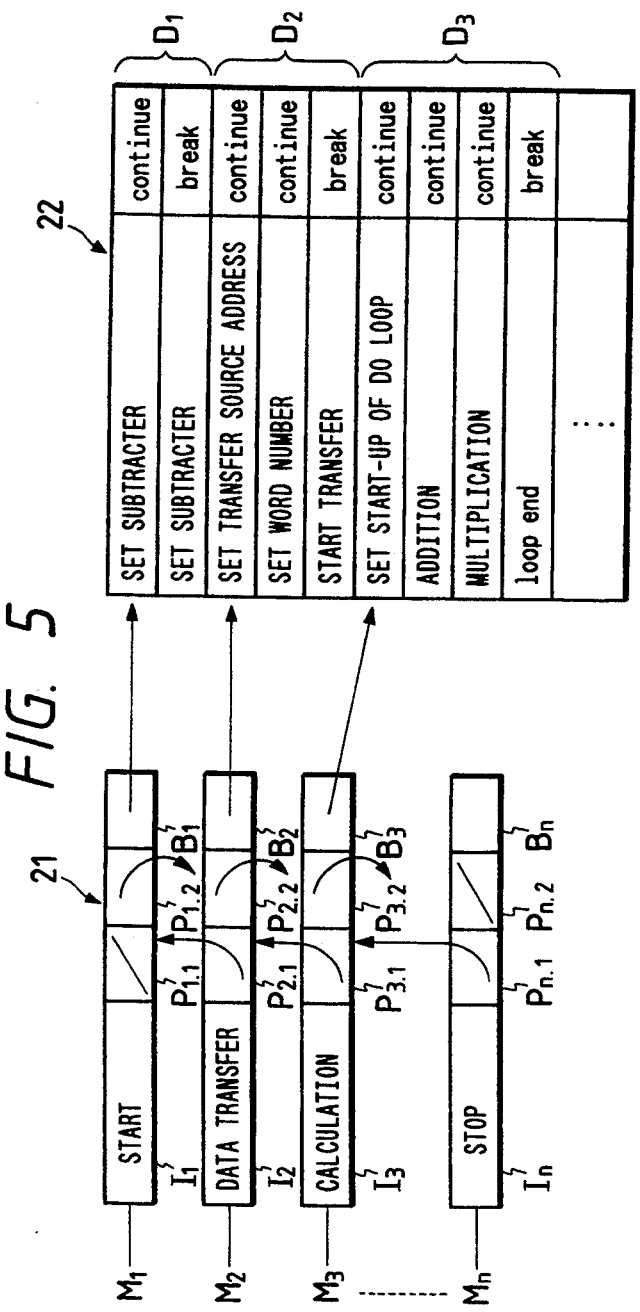

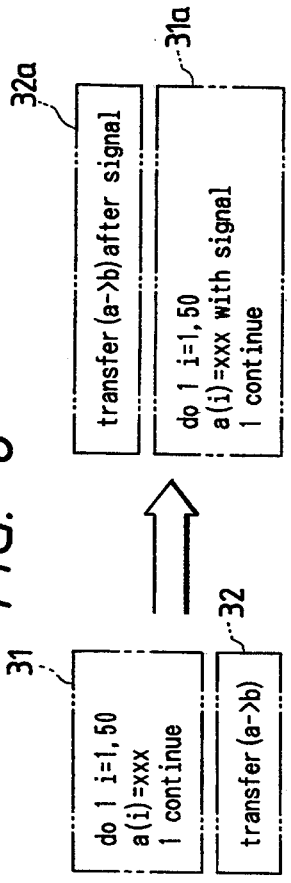
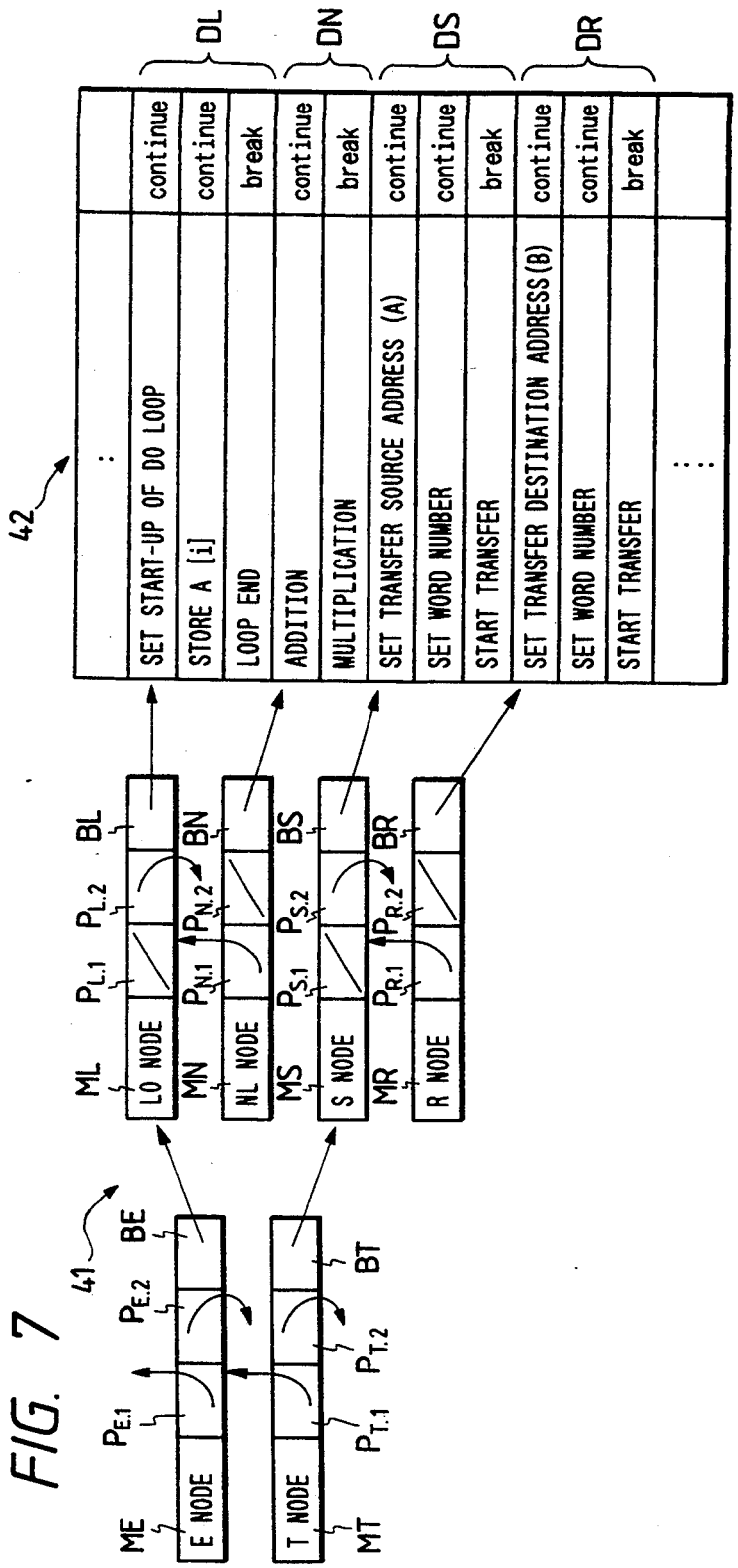

METHOD AND APPARATUS FOR COMPILER PROCESSING ON PROGRAM RELATED TO DATA TRANSFER AND CALCULATION, AND METHOD OF MANAGING MEMORY

This application is a continuation of application Ser. No. 07/581,944, filed Sep. 12, 1990, now abandoned.

BACKGROUND OF THE INVENTION

This invention relates to a method and an apparatus for compiler processing, and also relates to a method of memory management which is usable in compiler processing.

In program translation processing, a source program written in a higher programming language is automatically translated into an object program in machine-language or assembler-language. Such program translation processing is generally called compiler processing. The compiler processing includes various types of sub processing, such as word and phrase analysis, syntax analysis, semantics analysis, optimization, and object code generation.

The word and phrase analysis has a process of reading the source program, and a process of resolving the source program into basic program elements such as constants, reserved words, and delimiters.

The syntax analysis procedure includes a process of checking whether or not statements composing the program are grammatically correct on the basis of the results of the word and phrase analysis, and a process of generating an intermediate code, hereinafter referenced as an intermediate language and various tables in accordance with the grammar. The intermediate language and the tables are used in the code generation. In the case of an interpreter, the syntax analysis is final processing.

The code generation procedure includes a process of generating the object program from information of memory area allocation and the intermediate language which results from the syntax analysis.

The optimization procedure includes a process of shortening The execution time of the generated object program, and a process of reducing the memory area occupied by the object program.

In general, the syntax analysis uses a tree structure, for example, a list structure, as an intermediate language in order to enable efficient optimization. This is because the list structure has the following advantage. In the list structure, nodes (such as list structure elements) can be dynamically changed in position so that processing such as moving codes can be easily done. Accordingly, using the list structure enables easy optimization of a program to be compiled.

However, in the case of the list structure is used, there occur the following problems. Since a system call is performed to an operating system (OS) to require a memory area at any time during the execution of optimization, the processing time is increased by a kernel call. Fragmentation is caused by the consumption and the release of a memory which occur during the execution of compiling.

To prevent such problems, it is desirable to use arrays of a static structure as much as possible. In the case where such arrays are used, a memory area for compiler processing is previously allocated. Since the compiler can freely use this memory area, a kernel call is unnecessary and a problem of fragmentation is prevented.

Most of the parallel processing languages used for multi-processor parallel computers have two parts for expressing calculation (arithmetic operation) and data transfer respectively. Even in the case of a parallel processing language which does not have an explicit data transfer part, a data transfer part results during the processing. A multi-processor parallel computer needs an exchange of data between processors, thereby requiring data transfer.

The total processing time $P_{EXEC}$ for a given task in parallel processing can be expressed by use of the total processing time $S_{EXEC}$ for the same task in sequential processing as indicated by the following equation.

$$P_{EXEC} = P + S_{EXEC}/N + T$$

where N denotes the degree of parallel, and T denotes the data transfer time and P denotes the start-up time of the parallel processing. As understood from the above-mentioned equation, the efficiency of the parallel processing can be increased by shortening the data transfer time T.

One conceivable way of shortening the data transfer time T is that the processing of a data transfer part is executed by DMA (direct memory access) transfer during an interval where a processor internally executes calculation and thus does not use a bus. This enables the processing of the calculation part and the processing of the data transfer part to be executed in parallel. In order to realize this approach, the optimization is required to execute an operation of moving codes of the data transfer part to positions prior to codes of the calculation part and an operation of generating a code for starting up the DMA transfer. Such movement of codes is difficult when an intermediate language is expressed by use of an array.

A data structure such as a list structure enables easy movement of codes as described previously, but its generation requires a kernel call which spends a relatively long processing time.

SUMMARY OF THE INVENTION

It is an object of this invention to provide an improved method and an improved apparatus for compiler processing.

It is another object of this invention to provide an improved method of memory management which is usable in compiler processing.

According to a first aspect of this invention, a method of compiler processing comprises the steps of analyzing syntax of a source program to translate the source program into an intermediate language; subjecting the intermediate language to optimization to translate the intermediate language into an object program; expressing a description of macro portions by a list structure in the syntax analyzing step, wherein the macro portions are subjected to a code movement by the optimization; expressing a description of details of the macro portions by an array; and designating the array corresponding to the description of the details of the macro portions by pointers provided in attributes of elements representing the macro portions in the list structure.

According to a second aspect of this invention, a method of managing a memory comprises the steps of, in cases where a memory area of a given size P is acquired from an unused memory area by application, acquiring a memory area of a size Q larger than the size P by a kernel call, and acquiring the memory area of the size P from the memory area of the size Q in the application, or acquiring the memory area of the size P from the unused memory area without a kernel call when an unused area of the size P is present in a memory area which is previously acquired by a kernel call.

According to a third aspect of this invention, an apparatus for compiler processing comprises means for analyzing syntax of a source program to translate the source program into an intermediate language; means for subjecting the intermediate language to optimization to translate the intermediate language into an object program; means for expressing a description of macro portions by a list structure, wherein the macro portions are subjected to a code movement by the optimization; means for expressing a description of details of the macro portions by an array; and means for designating the array corresponding to the description of the details of the macro portions by pointers provided in attributes of elements representing the macro portions in the list structure.

BRIEF DESCRIPTION OF THE DRAWINGS

FIG. 4 is a diagram showing code movement executed in the first embodiment.

FIG. 5 is a diagram of a memory structure in the first embodiment.

FIG. 6 is a diagram showing code movement executed in a second embodiment of this invention.

FIGS. 7 and 8 are diagrams showing memory structures in the second embodiment.

DESCRIPTION OF THE FIRST PREFERRED EMBODIMENT

Figure 1:
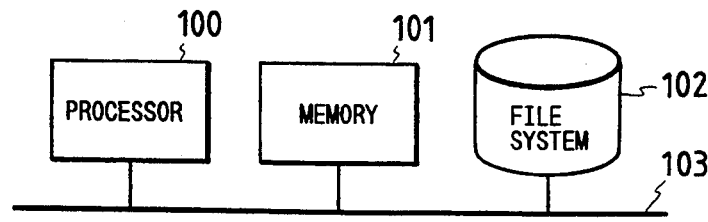
FIGS. 1-3 are diagrams of a part of a computer in a first embodiment of this invention.

With reference to FIG. 1, a computer includes a processor 100, a memory 101, and a file system 102 which are mutually connected via a bus 103. The file system 102 stores information such as a compiler, a source program (a program to be compiled), and data. The processor 100 reads the source program and the data from the file system 102 via the bus 103, and also writes an object program (the results of compiling) and data into the file system 102 via the bus 103. The processor 100 executes operations and calculations required for compiling the source program by use of the memory 101.

In preparation for a compiling process, an operating system (OS) orders the memory 101 to be loaded with the compiler from the file system 102 via the bus 103. After the preparation is completed, the processor 100 executes a compiling process in accordance with the compiler stored in the memory 101.

Figure 2:
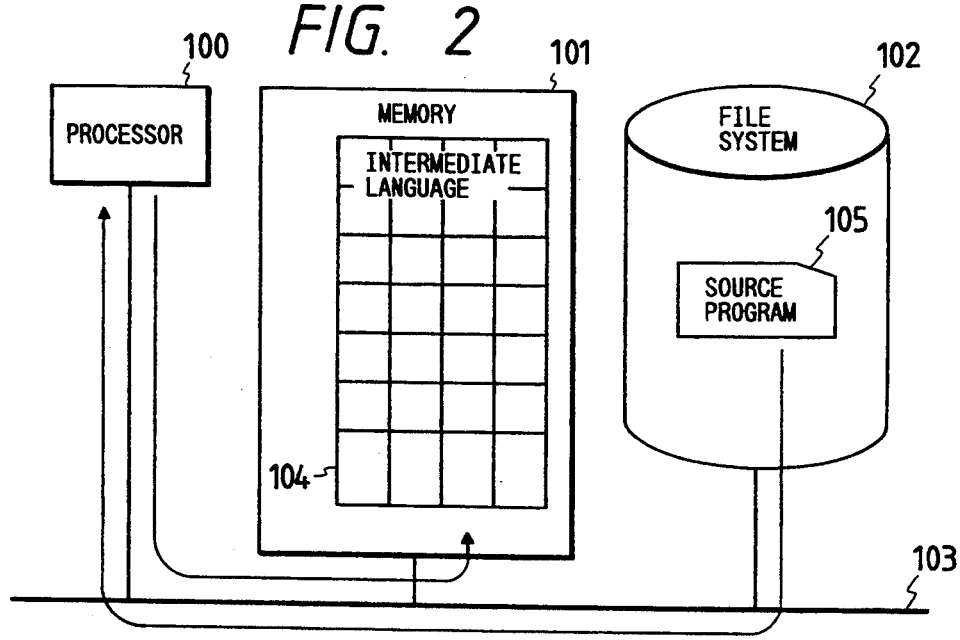
Figure 3:
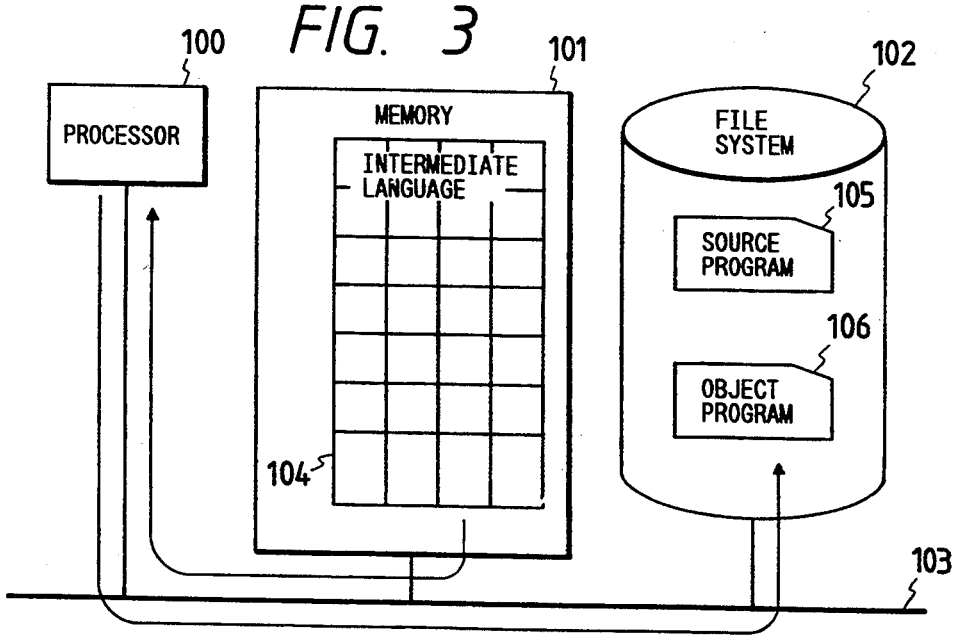

As shown in FIG. 2, during a compiling process. the processor 100 reads a source program 105 from the file system 102 via the bus 103, and subjects the source program 105 to syntax analysis and semantics analysis and thereby derives an intermediate language 104 corresponding to the source program 105. The processor 100 stores the intermediate language 104 into the memory 101 via the bus 103. In addition, as shown in FIG. 3, the processor 100 reads the intermediate language 104 from the memory 101 via the bus 103, and generates object codes by use of the intermediate language 104. The generated codes compose an object program 106. Finally, the processor 100 stores the object program 106 into the file system 102.

A detailed description will now be given of compiler processing, optimization, storing the intermediate language 104 into the memory 101, management of the memory 101, and others.

It is now assumed that the source program 105 is written by FORTRAN and has contents such as shown in the left-hand part of FIG. 4. The source code for the source program 105 includes macro portions, such as a calculation part (an arithmetic operation part) 11 and a data transfer part 12. The calculation part 11 is followed by the data transfer part 12. The calculation part 11 is illustrated by a do loop. The data transfer part 12 includes a statement for transferring an array "c" to an array "b" In FIG. 4, "transfer (c→b)" denotes a pseudo instruction for transferring the array "c" to the array "b".

In the case where the data transfer part 12 is moved to a position prior to the calculation part 11 as shown in the right-hand part of FIG. 4 and where the processing of the data transfer part 12 is executed by DMA transfer and the processing of the calculation part 11 is executed by the processor 100 in parallel with the execution of the data transfer part 12, the processing efficiency is increased. Such a conversion of the program is performed in optimization in compiler processing.

In the syntax analysis for translating the source program 105 into the intermediate language 104, macro operations corresponding to the calculation part 11, the data transfer part 12, and other parts of the source program 105 are expressed by a list structure 21 as shown in FIG. 5. It should be noted that FIG. 5 shows a memory configuration in this embodiment. The macro operations expressed by list structure 21 are stored in the memory 101. The use of the list structure 21 enables movement of codes which relates to the movement of the data transfer part 12 to a position prior to the calculation part 11.

The list structure 21 has elements (or nodes) $M_1 \sim M_n$ which represent the respective macro operations. For example, the element $M_1$ contains fields corresponding to an operation item name $I_1$, first and second pointers $P_{1.1}$ and $P_{1.2}$, and an attribute $B_1$. The other elements have similar structures. FIG. 5 shows conditions which occur after the movement of codes. Accordingly, in FIG. 5, the element $M_2$ corresponding to the data transfer part 12 precedes the element $M_3$ corresponding to the calculation part 11.

Detailed operations represented by the elements $M_1 \sim M_n$ are expressed as an array 22. The array 22 is stored in the memory 101. For example, the details of the operations performed by element $M_2$ are represented by a portion $D_2$ of the array 22, and a pointer in the field representing attribute B of the element $M_2$ designates the array portion $D_2$ and thereby the array portion $D_2$ is defined as part of the intermediate language corresponding to the data transfer part 12 and the element $M_2$.

The first pointers $P_{2.1} \sim P_{n.1}$ of the elements $M_2 \sim M_n$ designate the first pointers $P_{1.1} \sim P_{(n-1).1}$ of the immediately preceding elements $M_1 \sim M_{n-1}$ respectively, and are used for searching a start portion of the operations. In FIG. 5, the element $M_1$ has a null code (shown as an inclined line) and thus represents an operation start, and the first pointers are used in searching the operation-start element $M_1$.

The second pointers $P_{1.2} \sim P_{(n-1).2}$ of the elements $M_1 \sim M_{n-1}$ designate the second pointers $P_{2.2} \sim P_{n.2}$ of the immediately following elements $M_2 \sim M_n$ respectively. The second pointers determine the sequence of execution of the operations. In FIG. 5, an end point of the execution of the operations represented by the element $M_n$ which has a null code (shown as an inclined line).

As described previously, the macro operations are expressed by the list structure 21. Accordingly, the movement of codes or the exchange of the positions of the calculation part 11 and the data transfer part 12 can be easily performed by changing the first and second pointers of the elements. In addition, the code movement is implemented when the attributes of the elements are designed to designate the segments of the array 22 which represent the operations in their details respectively. Since the array 22 is of a static structure, the necessary area of the memory 101 which is used by the compiler processing can be small.

DESCRIPTION OF THE SECOND PREFERRED EMBODIMENT

A second embodiment of this invention is similar to the embodiment of FIGS. 1–5 except for design changes indicated hereinafter.

A source program shown in the left-hand part of FIG. 6 is translated into an intermediate program shown in the right-hand part of FIG. 6 through compiler processing. The source program has a do loop 31 and a transfer instruction 32. The source program represents processing that an array a(i) is subjected to assignment in the do loop 31 and then data of the array a(i) are transferred by the transfer instruction 82. During the compiler processing, code movement is performed so that the transfer instruction is moved to a position prior to the do loop. The code movement enables the following operation. The data transfer is executed by DMA transfer, and the processing of the calculations in the do loop is executed by a processor in parallel with the execution of the data transfer.

In the intermediate program obtained after the code movement, since the data of the array a(i) which transferred by the transfer instruction are determined by the assignment in the do loop following the transfer instruction, the transfer of the data can not be done before the assignment. In view of this fact, the following design is adopted. The assignment instruction "a(i)=xxx" is changed to a signal-added assignment instruction "a(i)=xxx with signal" so that a transfer signal will be generated upon the execution of the assignment. In addition, the transfer instruction "transfer(a→b)" is changed to a signal-added transfer instruction "transfer-(a→b) after signal" so that the assigned data will be sequentially subjected to DMA transfer in synchronism with transfer signals generated at the execution of the assignment. Accordingly, as shown in the right-hand part of FIG. 6, a signal-added transfer instruction 32a precedes a do loop 31a. The signal-added transfer instruction 32a and the do loop 31a correspond to the transfer instruction 32 and the do loop 31 of the left-hand part of FIG. 6 respectively.

FIG. 7 shows a list structure 41 and an array 42 which occur before the code movement is done. Thus, the list structure 41 and the array 42 corresponds to the source program in respect of an instruction sequence. The array 42 represents the details of the list structure 41. It should be noted that FIG. 7 shows a memory structure in this embodiment.

The list structure 41 has a plurality of elements including elements ME and MT. The element ME has an E node, representing the execution of data calculation. The element MT has a T node, representing data transfer. The E node is separated into an LO node and an NL node. The LO node represents loop calculation while the NL node represents non-loop calculation. An element ML with an LO node is designated by an attribute BE of the E node element ME. The T node is separated into an S node and an R node representative of sending and receiving respectively. An attribute BT of the T node element MT designates an element MS with an S node. The character MN denotes an element with an NL node. The character MR denotes an element with an R node.

The elements ME, MT, ML, MN, MS, and MR have first pointers $P_{E.1}$, $P_{T.1}$, $P_{L.1}$, $P_{N.1}$, $P_{S.1}$, and $P_{R.1}$ and second pointers $P_{E.2}$, $P_{T.2}$, $P_{L.2}$, $P_{N.2}$, $P_{S.2}$, and $P_{R.2}$ respectively. The first pointers are used for searching the element representing an operation start. The second pointers determine the sequence of execution of operations. Attributes BL, BN, BS, and BR designate portions DL, DN, DS, and DR of the array 42 which represent the details of the operations respectively.

By syntax analysis in the compiler processing, the source program is expressed in the list structure 41 and the array 42. Optimization which follows the syntax analysis executes the code movement corresponding the conversion of the program of the left-hand part of FIG. 6 to the program of the right-hand part of FIG. 6.

Figure 8:
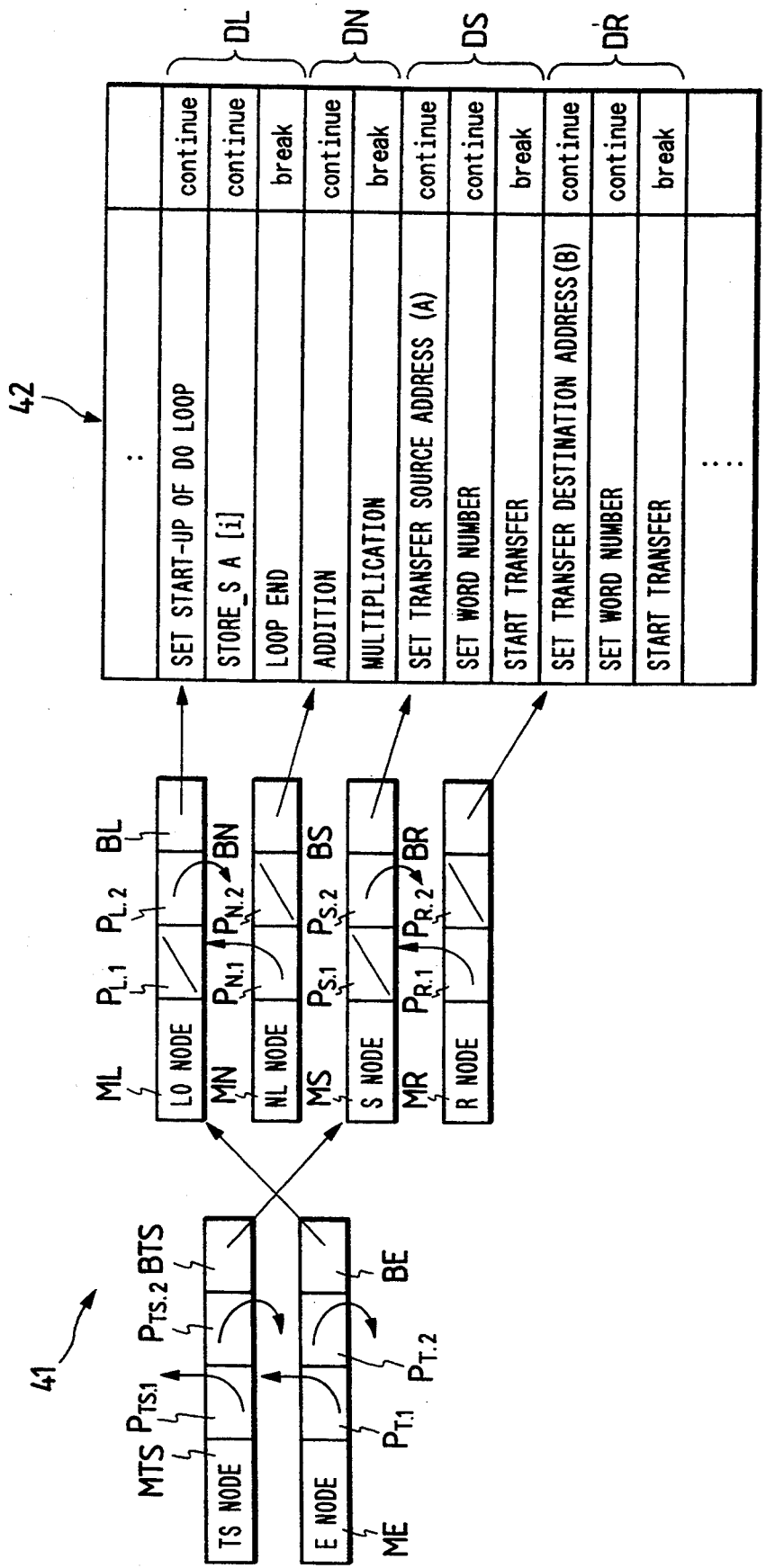

FIG. 8 shows a memory configuration which occurs after the code movement is executed. In FIG. 8, an element MTS precedes the E node element ME representing the data calculation. The element MTS is generated from the element MT by replacing the T node with a TS node. The T node represents data transfer by DMA transfer while the TS node represents signal-added data transfer. In the array portion DL which is designated by the attribute BL of the LO node element ML, a store instruction "STORE" representative of assignment is changed to a signal-added store instruction "STORE_S" for generating a transfer signal upon the assignment of data to the array a(i). The element MTS has a first pointer $P_{TS.1}$, a second pointer $P_{TS.2}$, and an attribute BTS.

The code movement in the list structure 41 and the instruction changes in the array 42 realize the optimization corresponding to the conversion of the source program of the left-hand part of FIG. 6 to the intermediate program of the right-hand part of FIG. 6.

Such data conversion is enabled when the following conditions (1)–(3) are satisfied.

(1) The source operand of a transfer instruction in the array, which is designated by the attribute of an S node being a partial structure (a sub structure) of a T node, is the destination operand of a store instruction in the array which is designated by the attribute of an LO node being a partial structure of an E node preceding the T node. When this condition is not satisfied, that is, when the source operand disagrees with the destination operand, it is unnecessary to perform signal-added transfer and the processing is done as in the embodiment of FIGS. 1–5.

(2) The source operand of a transfer instruction in the array, which is designated by the attribute of an S node being a partial structure of a T node, is not contained in the destination operand of a store instruction in the array which is designated by the attribute of an NL node following an LO node being a partial structure of an E node. In general, an NL node carries out data processing such as assignment only to a given element of an array. When the condition is not satisfied, and specifically when the destination operand of such an NL node is equal to the source operand of the transfer, only data transfer related to the given element of the array needs to be abandoned in DMA transfer synchronous with the generation of a transfer signal upon the assignment of data to the array so that the processing is complicated.

(3) The execution range of an LO node agrees with the execution range of a T node. Specifically, the LO node and the T node agree with each other in the variable ranges of parameters of the array. When this condition is not satisfied, it is necessary to execute such complicated processing that the generation of a transfer signal upon the execution of an assignment instruction is performed only with respect to a parameter or parameters within a certain range.

In the case where the above-mentioned conditions (1)–(3) are satisfied, the list structure can be converted. Thereby, parallel processing of data transfer and data calculation is realized in a manner such that synchronization is well maintained by transfer signals.

Figure 9A:
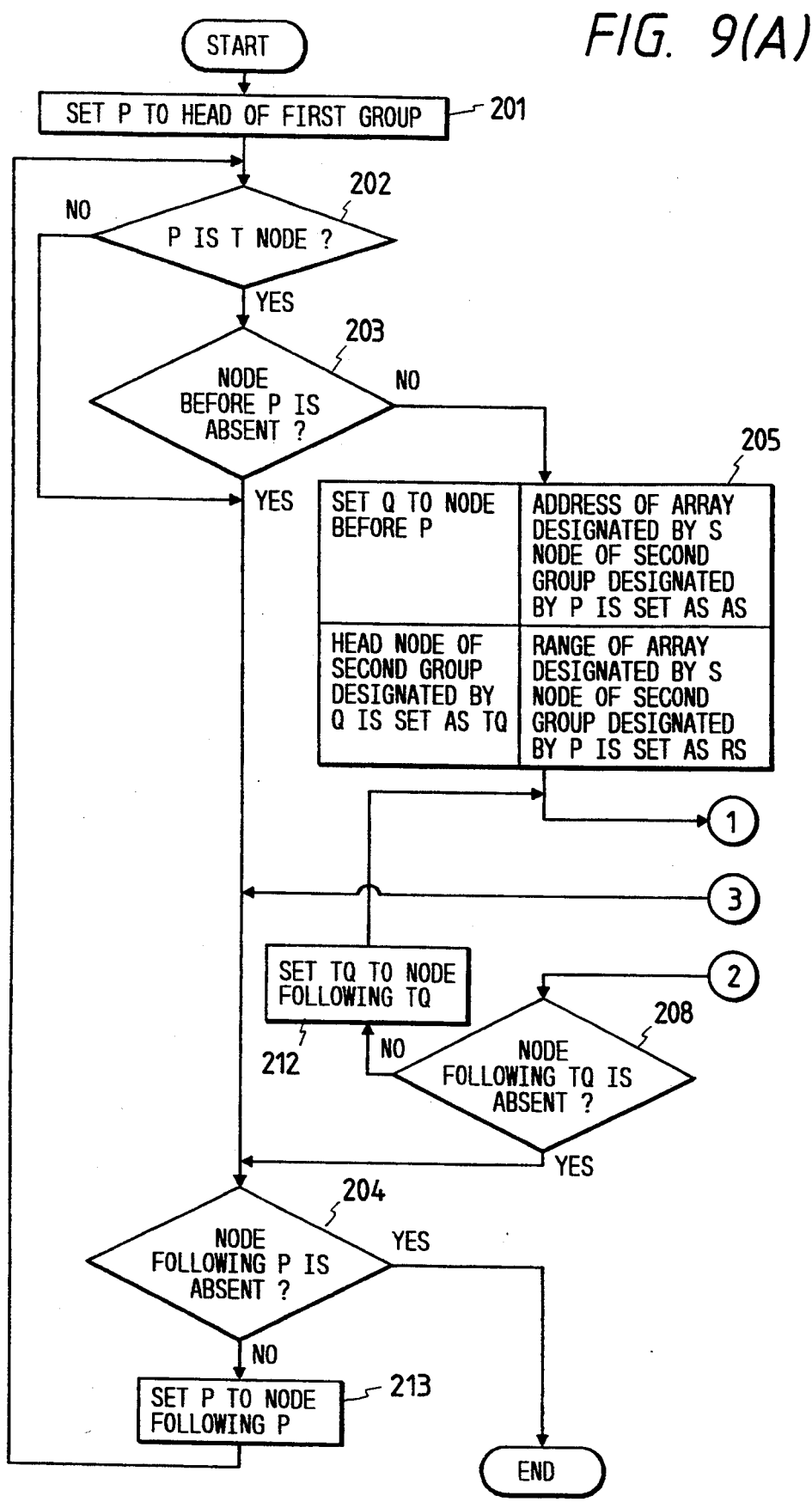
FIGS. 9(A) and 9(B) are a flowchart of a part of a compiler in the second embodiment.
Figure 9B:
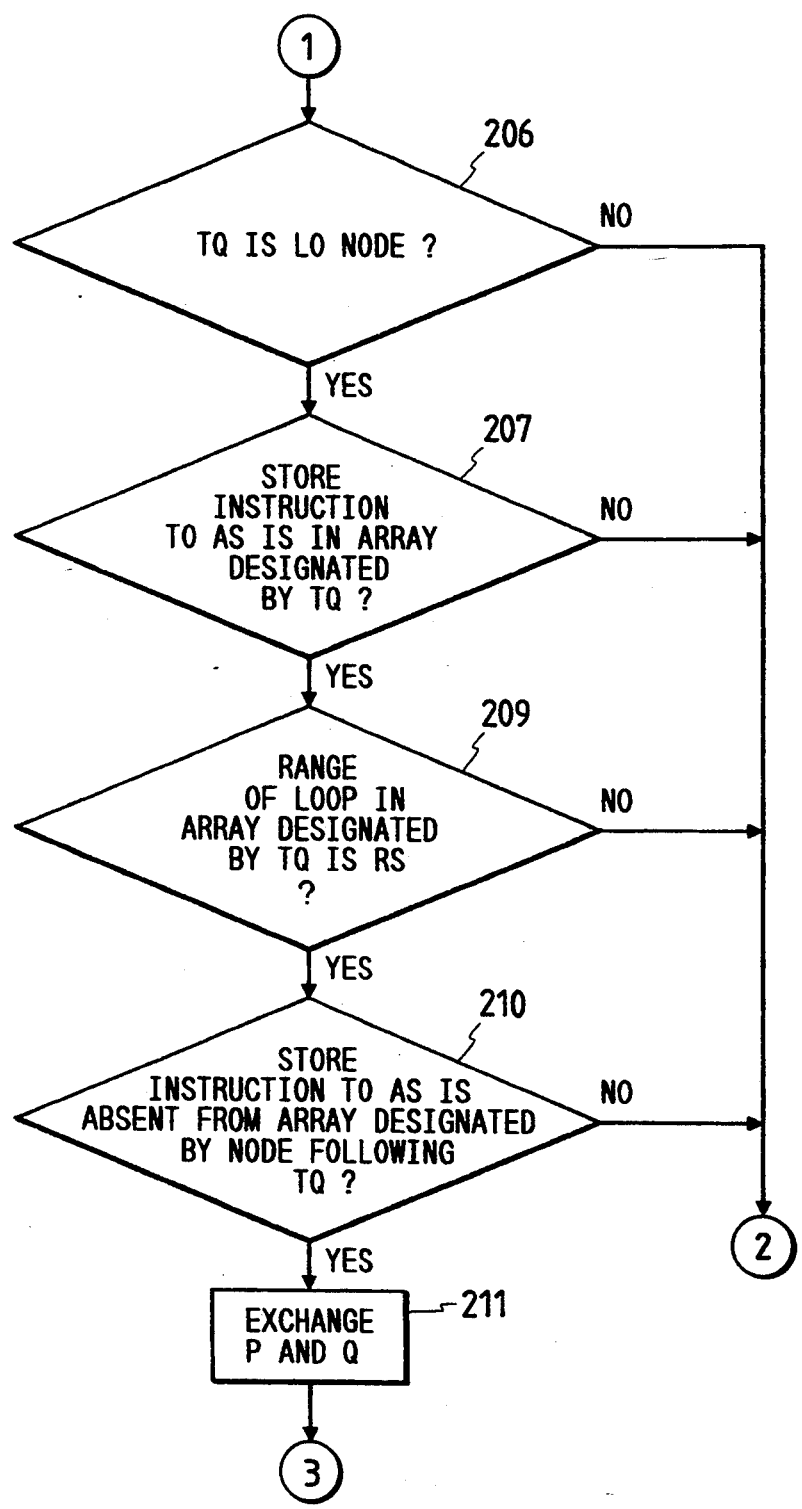

FIGS. 9(A) and 9(B) show a flowchart of the part of the compiler which relates to the code movement or the conversion of the program of FIG. 7 to the program of FIG. 8. In FIGS. 9(A) and 9(B), the E node and the T node are separated in a first group while the LO node, the NL node, the S node, and the R node are separated in a second group.

In FIGS. 9(A) and 9(B), a first step 201 sets P to a head (a starting node) of the first group. After the step 201, a step 202 is executed. The step 202 decides whether or not P is a T node. When P is the T node, a step 203 is executed. When P is not the T node, a step 204 is executed. The step 203 decides whether or not a node preceding P is absent. When the node preceding P is absent, the step 204 is executed. When the node preceding P is present, a step 205 is executed. The step 205 sets Q to the node preceding P. The step 205 sets TQ to a head of the second group which is designated by Q. The step 205 sets AS to an address of the array designated by an S node of the second group which is designated by P. The step 205 sets RS to a range of the array designated by the S node of the second group which is designated by P. After the step 205, a step 206 is executed.

The step 206 decides whether or not TQ is an LO node. When TQ is the LO node, a step 207 is executed. When TQ is not the LO node, a step 208 is executed. The step 207 decides whether or not a store instruction to AS is present in the array designated by TO. When the result of the decision by the step 207 is positive, a step 209 is executed. When the result of the decision by the step 207 is negative, the step 208 is executed. The step 209 decides whether or not a range of a loop in the array designated by TQ is RS. When the result of the decision by the step 209 is positive, a step 210 is executed. When the result of the decision by the step 209 is negative, the step 208 is executed. The step 210 decides whether or not a store instruction to AS is absent from the array designated by a node following TQ. When the result of the decision by the step 210 is positive, a step 211 is executed. When the result of the decision by the step 210 is negative, the step 208 is executed. The step 211 exchanges P and Q. After the step 211, the step 204 is executed.

The step 208 decides whether or not a node following TQ is absent. When the node following TQ is absent, the step 204 is executed. When the node following TQ is present, a step 212 is executed. The step 212 updates TQ by setting TQ (new) to the node following TQ (old). After the step 212, return to the step 206 is done. The step 204 decides whether or not a node following P is absent. When the node following P is absent, the processing of FIGS. 9(A) and 9(B) is ended. When the node following P is present, a step 213 is executed. The step 213 updates P by setting P (new) to the node following P (old). After the step 213, return to the step 202 is done.

Figure 10:
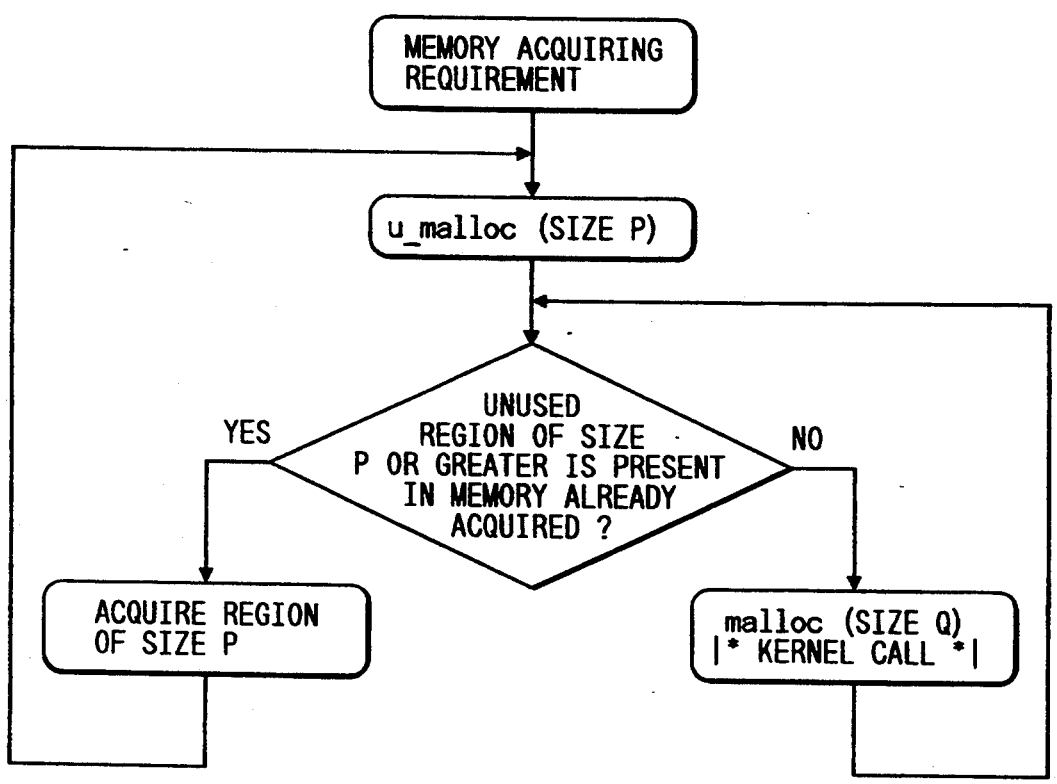
FIG. 10 is a flowchart of memory acquirement in the second embodiment.

FIG. 10 is a flowchart of processing for memory allocation or acquirement in the memory management. A description will now be given of the case where a memory acquiring requirement is generated by application. Firstly, a user function "u-malloc" is started up. Since this function does not correspond to a kernel call, an extension of the execution of normal application is performed. A check is made as to whether or not an unused region having a size equal to or greater than P is present in the memory acquired by a previous kernel call in the user function. "u-malloc". When the unused region is present, the unused region is changed to a region in use and a pointer of the region is returned. When the unused region is absent, a region of a size Q greater than the size P is newly acquired by a kernel call and a portion of the region is changed to a region in use. In addition, a pointer of the used region is returned. For example, when P=8 bytes, Q=256 bytes. The possibility of generation of a kernel call will now be considered. The possibility of generation of a kernel call in the above-mentioned case is 1/32 of that in a conventional case. This value fully depends on the ratio Q/P, and one key point is to determine this value. In general application, the size P is constant. Application using an incremental list has a structure of two words of a value part and a pointer part. Application with back pointers has a 3-word structure. Accordingly, in the case where a suitable size Q is previously used in consideration of a word structure during the development of an application software, a good operating efficiency can be expected. In this embodiment, a 4-word structure is preferably used.

What is claimed is:

1. In a method of compiler processing executed by a computer, including the steps of analyzing syntax of a source program and translating the source program into an intermediate code and performing a code movement, in which the source program includes macro portions in a source code, each macro portion being a source code statement which, when compiled, corresponds to a plurality of machine code instructions, the macro portions corresponding to a plurality of operation details, an improvement comprising:

generating intermediate code to represent the source program both by an array structure and a linked list structure pointing thereto, by:

in the step of analyzing syntax of the source program, simplifying code movement by expressing the macro portions of the source program as a list structure including list elements respectively representing the macro portion, said list elements having fields corresponding to respective operations of the respective macro portions, the list elements including an E element and a T element, the E element representing execution of a calculation operation, the T element representing a data transfer operation, the E element having sub structures including an LO element and an NL element, the LO element representing a loop operation, the NL node representing a non-loop operation, the T element having sub structures including an S element and an R element, the S element representing sending of data, the R element representing receiving of data; and further comprising the steps of:

expressing a description of the plurality of operation details of the macro portions as an array including a plurality of array portions;

designating the array portions corresponding to the operation details of respective ones of the macro portions by pointers provided in the fields of list elements representing the respective macro portions in the list structure;

searching and moving elements of a syntax analysis structure, in which an E element precedes a T element in a sequence, to an opposite sequence in which a data transfer element precedes the E element;

in cases where a source operand of an assignment instruction in an array portion designated by a field of the S element, which is a sub structure of the T element, is a destination operand of a store instruction in an array portion designated by a pointer of a field of the LO element which is a sub structure of the E element preceding the T element, and is not contained in a destination operand of a store instruction in an array portion designated by a field of the NL element following the LO element, and where an execution range of the LO element is equal to an execution range of the T element:

changing the store instruction in the array portion designated by the field of the LO element into a signal-added store instruction for generating a transfer signal for instructing data transfer upon execution thereof, changing the T element into a TS element for performing data transfer in synchronism with generation of the transfer signal, where a TS element represents a signal-added data transfer, and moving the TS element to a position prior to the E element.

2. The method of claim 1 further comprising the step of managing a memory to acquire a memory area and to arrange the memory area into a list structure of the intermediate code, and wherein the step of managing a memory comprises the steps of:

in cases where a memory area of a first predetermined size is required to be acquired from an unused memory area, using the computer to make a kernel call for acquiring a memory area of a second predetermined size larger than the first predetermined size and acquiring the memory area of the first predetermined size from the memory area of the second predetermined size and, in cases where an unused area of a size equal to or greater than the first predetermined size is present in a memory area in accordance with a previous kernel call, acquiring the memory area of the first predetermined size from the unused memory area without a kernel call.

3. The method of claim 1, wherein said steps of simplifying code movement by expressing the macro portions of the source program as a list structure comprises providing a plurality of list elements each corresponding to a macro operation and providing a pair of pointers in each list element, a first pointer designating a first pointer of a preceding element and a second pointer designating a second pointer of a succeeding element, and said step of performing a code movement comprises changing the first and second pointers of the elements.

4. In a programmed computer apparatus for compiler processing, the programmed computer apparatus including first programmed means for analyzing syntax of a source program and translating the source program into an intermediate code and for performing a code movement, in which the source program includes macro portions in a source code, each macro portion being a source code statement which, when complied, the macro portions corresponding to a plurality of operation details, an improvement comprising means for generating intermediate code to represent the source program both by an array structure and a linked list structure pointing thereto, including:

second programmed means for simplifying code movement by the first programmed means, by expressing the macro portions of the source program as a list structure including list elements respectively representing the macro portions, said list elements having fields corresponding to respective operations of the respective macro portions;

the list elements including an E element and a T element, the E element representing execution of a calculation operations, the T element representing a data transfer operation, the the E element having sub structures including an LO element and an NL element, the LO element representing a loop operation, the NL element representing a non-loop operation, the T element having sub structures including an S element and an R element, the S element representing sending of data, the R element representing receiving of data;

third programmed means for expressing a description of the plurality of operation details of the macro portions as an array including a plurality of array portions; and fourth programmed means for designating the array portions corresponding to the operation details of respective ones of the macro portions by pointers provided in the fields of list elements representing the respective macro portions in the list structure, means for moving elements of a syntax analysis structure, in which an E element precedes a T element in a sequence, to an opposite sequence in which a data transfer element precedes the E element; and means for, in cases where a source operand of an assignment instruction in an array portion designated by a field of the S element, which is a sub structure of the T element, is a destination operand of a store instruction in an array portion designated by a pointer of a field of the LO element, which is a sub structure of the E element preceding the T element, and is not contained in a destination operand of a store instruction in an array portion designated by a field of the NL element following the LO element, and where an execution range of the LO element is equal to an execution range of the T element, changing the store instruction in the array portion designated by the field of the LO element into a signal-added store instruction for generating a transfer signal for instructing data transfer upon execution thereof, changing the T element into a TS element for performing data transfer in synchronism with generation of the transfer signal, where a TS element represents a signal-added data transfer, and moving the TS element to a position prior to the E element.

5. The apparatus of claim 4, wherein said second programmed means for expressing a description of the macro portions of the source program provides a plurality of list elements each corresponding to a macro operation and provides a pair of pointers in each list element, a first pointer designating a first pointer of a preceding element and a second pointer designating a second pointer of a succeeding element, and said first programmed means includes fifth programmed means for changing the first and second pointers of the elements to perform a code movement.

* * * * *